United States Patent
Choi et al.

(10) Patent No.: US 10,473,967 B2
(45) Date of Patent: Nov. 12, 2019

(54) DISPLAY DEVICE

(71) Applicant: Microsoft Technology Licensing, LLC, Redmond, WA (US)

(72) Inventors: Minhyuk Choi, Sammamish, WA (US); Kabir Siddiqui, Sammamish, WA (US); Rajesh Manohar Dighde, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 177 days.

(21) Appl. No.: 15/627,265

(22) Filed: Jun. 19, 2017

(65) Prior Publication Data
US 2018/0246365 A1    Aug. 30, 2018

Related U.S. Application Data (60) Provisional application No. 62/465,137, filed on Feb. 28, 2017, provisional application No. 62/475,145, filed on Mar. 22, 2017.

(51) Int. Cl.
*G02F 1/1335*    (2006.01)
*G02F 1/13357*   (2006.01)
(Continued)

(52) U.S. Cl.
CPC ......... *G02F 1/1335* (2013.01); *G02B 6/0081* (2013.01); *G02F 1/0311* (2013.01);
(Continued)

(58) Field of Classification Search
CPC ..... G02B 6/0081; G02F 1/0311; G02F 1/133; G02F 1/133308; G02F 1/1335;
(Continued)

(56) References Cited

U.S. PATENT DOCUMENTS 8,872,997 B2 * 10/2014 Rothkopf ............ H04M 1/0266
349/58
9,297,948 B1 *  3/2016 Zhou .................... G02B 6/0086
(Continued)

FOREIGN PATENT DOCUMENTS

EP    2388687 A2    11/2011
EP    2728433 A1     5/2014
(Continued)

OTHER PUBLICATIONS

Kapur, Vicky, "How phone screen with world's thinnest border was made", Nov. 1, 2014, 5 pages. Available at: http://www.emirates247.com/business/technology/how-phone-screen-with-world-s-thinnest-border-was-made-2014-11-01-1.568403.
(Continued)

*Primary Examiner* — Kenneth Bukowski
(74) *Attorney, Agent, or Firm* — Alleman Hall Creasman & Tuttle LLP (57) ABSTRACT

A display device comprises a chassis and a cover glass substrate. A display unit is positioned between the cover glass substrate and the chassis. The display unit comprises a backlight housing comprising a shelf between the cover glass substrate and a base. A light guide plate is positioned within the backlight housing. A display glass substrate is positioned between the light guide plate and the cover glass substrate, with the display glass substrate bonded to the shelf.

20 Claims, 11 Drawing Sheets (51) Int. Cl.
*F21V 8/00* (2006.01)
*G02F 1/03* (2006.01)
*G02F 1/133* (2006.01)
*G02F 1/1333* (2006.01)
*G06F 1/16* (2006.01)

(52) U.S. Cl.
CPC ............ *G02F 1/133* (2013.01); *G02F 1/1336* (2013.01); *G02F 1/133308* (2013.01); *G02F 1/133528* (2013.01); *G02F 1/133553* (2013.01); *G06F 1/1641* (2013.01); *G02F 2001/133317* (2013.01); *G02F 2001/133331* (2013.01)

(58) Field of Classification Search
CPC ......... G02F 1/133528; G02F 1/133553; G02F 1/1336; G02F 2001/133317; G02F 2001/133331; G06F 1/1641
See application file for complete search history.

(56) References Cited

U.S. PATENT DOCUMENTS

| | | | |
|---|---|---|---|
| 2005/0280751 A1* | 12/2005 | Kim | G02F 1/133308 349/58 |
| 2007/0115692 A1 | 5/2007 | Yao | |
| 2007/0127144 A1 | 6/2007 | Gao | |
| 2008/0203907 A1* | 8/2008 | Lee | H01L 27/3293 313/504 |
| 2010/0014015 A1* | 1/2010 | Ho | G02F 1/133605 349/58 |
| 2011/0175086 A1* | 7/2011 | Katoh | H01L 27/14643 257/53 |
| 2011/0187956 A1* | 8/2011 | Kim | G02F 1/1333 349/58 |
| 2011/0279961 A1 | 11/2011 | Shedletsky et al. | |
| 2011/0285607 A1 | 11/2011 | Kim | |
| 2013/0038809 A1* | 2/2013 | Hung | G02F 1/133308 349/58 |
| 2013/0148046 A1* | 6/2013 | Chang | G02F 1/1313 349/15 |
| 2013/0155351 A1 | 6/2013 | Garelli et al. | |
| 2013/0235561 A1 | 9/2013 | Etienne et al. | |
| 2013/0257685 A1* | 10/2013 | Kim | G06F 1/1616 345/1.3 |
| 2013/0263488 A1* | 10/2013 | Wu | G02B 6/0088 40/773 |
| 2013/0271957 A1 | 10/2013 | Etienne et al. | |
| 2013/0308296 A1 | 11/2013 | Yoo et al. | |
| 2014/0049522 A1* | 2/2014 | Mathew | H05B 33/0896 345/204 |
| 2014/0145150 A1 | 5/2014 | de jong et al. | |
| 2014/0177268 A1 | 6/2014 | Zhou | |
| 2015/0212361 A1 | 7/2015 | Zhao et al. | |
| 2015/0247967 A1 | 9/2015 | Horiuchi et al. | |
| 2015/0323831 A1 | 11/2015 | Yang et al. | |
| 2015/0362666 A1 | 12/2015 | Jia et al. | |
| 2016/0085109 A1 | 3/2016 | Baek et al. | |
| 2016/0274296 A1 | 9/2016 | Zhou | |
| 2016/0320658 A1 | 11/2016 | Reightler et al. | |
| 2016/0320660 A1* | 11/2016 | Jean | H04N 5/64 |
| 2018/0246355 A1 | 8/2018 | Dighde et al. | |

FOREIGN PATENT DOCUMENTS

| | | |
|---|---|---|
| KR | 20090030903 A | 3/2009 |
| WO | 2015041388 A1 | 3/2015 |
| WO | 2015069640 A1 | 5/2015 |
| WO | 2016105022 A1 | 6/2016 |

OTHER PUBLICATIONS

"Non Final Office Action Issued in U.S. Appl. No. 15/627,301", dated Oct. 24, 2018, 12 Pages.

"International Search Report and Written opinion Issued in PCT Application No. PCT/US2018/019612", dated Aug. 1, 2018, 19 Pages.

* cited by examiner

DISPLAY DEVICE

CROSS REFERENCE TO RELATED APPLICATIONS

This application claims priority to U.S. Provisional Patent Application No. 62/465,137 filed Feb. 28, 2017, and to U.S. Provisional Patent Application No. 62/475,145 filed Mar. 22, 2017, the entirety of which are hereby incorporated herein by reference.

BACKGROUND

Some display devices include an active display area operable to output visible imagery and a non-active display area in which visible imagery is not displayed. A bezel between an outer edge of the active display area and an outer edge of a device chassis may define at least a portion of the non-active display area.

SUMMARY

A display device may comprise a chassis, a cover glass substrate, and a display unit positioned between the cover glass substrate and the chassis. The display unit includes a backlight housing comprising a shelf between the cover glass substrate and a base. A light guide plate is positioned within the backlight housing. A display glass substrate is between the light guide plate and the cover glass substrate, with the display glass substrate bonded to the shelf.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In the drawings, like reference numerals indicate like parts throughout the various views, except where indicated otherwise.

DETAILED DESCRIPTION

As noted above some display devices, such as mobile display devices, may include an active display area in which display elements operate to produce visible imagery, and a non-active display area in which displayed imagery is not visible. In some examples electronics that drive operation of the display elements may be disposed in the non-active display area. The non-active display area may occupy a perimeter portion of the display device—e.g., the perimeter portion may surround the active display area. The non-active display area may be defined by a bezel between an outer edge of the active display area and an outer edge of a device chassis.

In some examples, the bezel may include a structure such as a black mask that conceals the non-active display area. To maximize the active display area of a display device, and correspondingly increase the aesthetic qualities of the device, it is desirable to minimize the size of the bezel. However, in some displays a reduction in bezel width may be limited by display component placement and configurations, tolerances and other considerations. For example, in some configurations a cover glass portion and one or more display components extend over and are bonded to an outer edge of the device chassis. These and other configurations may require minimum bezel widths of at least 2 mm. in a single display. In display devices that include two side-by-side displays, such as a hinged dual-display device, such configurations may result in a deadband region between a first active display area edge of the first display unit and a second active display area edge of the second display unit having a width of 4 mm. or more. Such bezel widths and deadband regions can provide a less-than-optimal aesthetic appearance and user experience.

Figure 1:
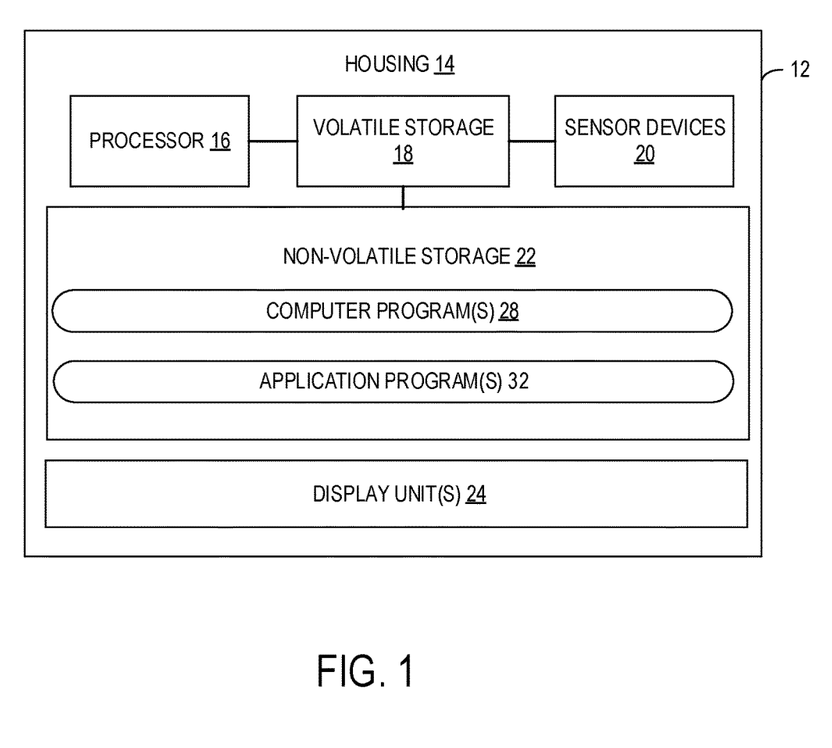
FIG. 1 shows a schematic diagram of a display device according to examples of the present disclosure.

Examples are described herein for providing a display device having display component configurations and structures that minimize a bezel width. FIG. 1 schematically illustrates an example of a display device in the form of a mobile computing device 12 including a housing 14. The housing 14 may take the form of one or more chassis surrounding internal electronics and providing structure for displays, sensors, speakers, buttons, etc. The housing 14 may include a processor 16, volatile storage device 18, sensor devices 20, non-volatile storage device 22, and one or more display units 24. As noted above and described in more detail below, in some examples the display device may comprise a dual-display device that includes two side-by-side display units 24 in two chassis that are rotatably coupled via one or more hinges. The processor 16 is configured to execute one or more computer programs 28, which may be an operating system or control program for the mobile computing device, and one or more application programs 32 stored on the non-volatile storage device 22, and to enact various control processes described herein.

The sensor devices 20 may include a plurality of different sensors, such as, for example, an accelerometer, an ambient light sensor, a forward facing camera, a microphone, a speaker, a depth camera, etc. The sensor devices 20 may also include a capacitive touch sensor, such as a capacitive array that is integrated with each of the one or more display units 24. It will be appreciated that the examples listed above are exemplary, and that other types of sensors not specifically mentioned above may also be included in the sensor devices 20 of the mobile computing device 12.

In some examples, the mobile computing device 12 may take the form of a smart phone device. In another example, the mobile computing device 12 may take other suitable forms, such as a tablet computing device or other computing device having one or more displays.

Figure 2:
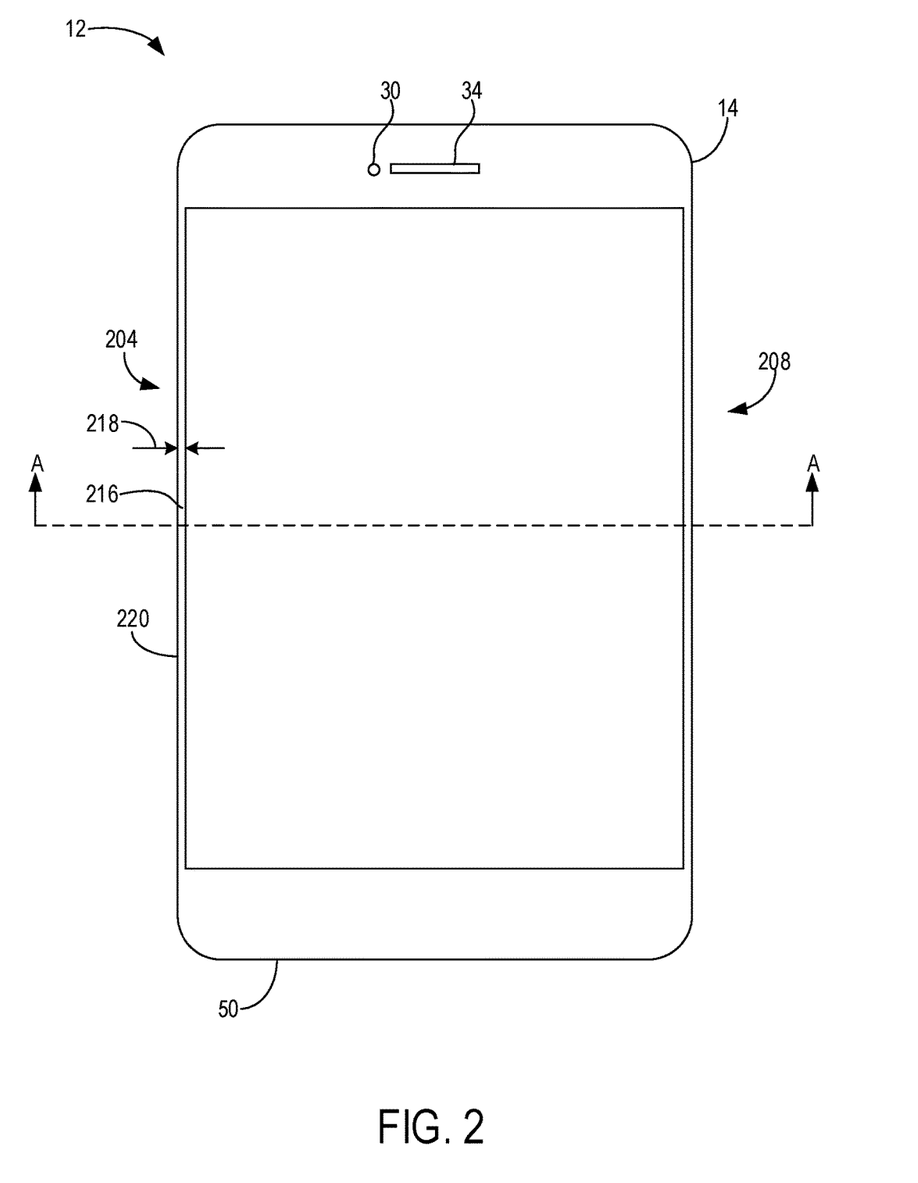
FIG. 2 shows a top view of a mobile display device according to examples of the present disclosure.

Turning to FIG. 2, one example of mobile computing device 12 is illustrated. As shown, the example mobile computing device 12 includes a housing 14. As discussed above, the housing 14 may be configured to internally house various electronic components of the mobile computing device 12. Additionally, the housing 14 may provide structural support for a display unit 24 and sensor devices 20. In the illustrated example, the sensor devices 20 include a forward-facing camera 30 and a speaker 34.

Figure 3:
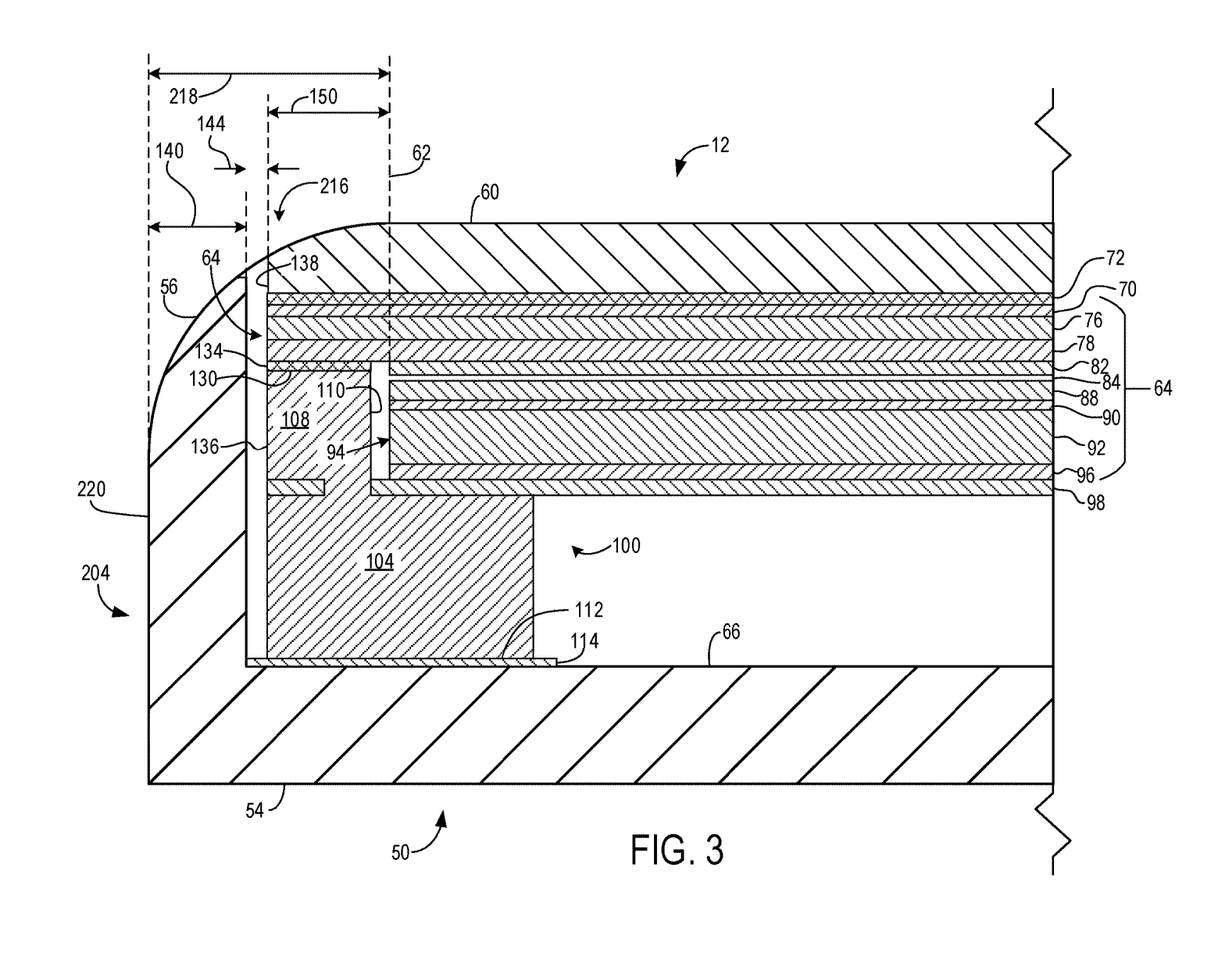
FIG. 3 shows a partial cross section view of the mobile display device taken along line A-A of FIG. 2 according to examples of the present disclosure.

FIG. 3 shows a partial sectional view taken along line A-A of FIG. 2 of a portion of a left side 204 of the mobile computing device 12 according to one example of the present disclosure. In this example, the mobile computing device 12 includes a chassis 50 that comprises a bottom portion 54 and a left projection 56 extending from the bottom portion. It will be appreciated that the chassis 50 also includes a right projection (not shown) on the opposite side from the left projection 56 that similarly extends from the bottom portion 54 in a mirror image to the left projection.

A cover glass substrate 60 overlies the components of a display unit 64 that are located between the cover glass substrate and a floor 66 of the bottom portion 54 of the chassis 50. In one example the display unit 64 may comprise a liquid crystal display (LCD). In this example, the cover glass substrate 60 is bonded to a front polarizer layer 70 of the LCD with an optically clear adhesive layer 72. Below the front polarizer layer 70 is a color filter glass substrate 76 and a display glass substrate 78. In this example, the display glass substrate 78 comprises thin films of an active semiconductor layer, a dielectric layer and metallic contacts deposited over a supporting glass substrate.

In this example, below the display glass substrate 78 is a rear polarizer layer 82 and an air gap 84. The air gap 84 may provide margin for component tolerances within the LCD and other display components. In some examples and in place of an air gap, a layer of reflective material may be utilized, such as a layer of rim tape or a film, ink or other reflective coating. In these examples, such reflective material may be provided near the perimeter of the active display area to reflect back light that otherwise may leak from the edge of the display.

Below the air gap 84 is an upper optical film layer 88 and a diffuser substrate 90. A light guide plate 92 is positioned below the diffuser substrate 90. In one example, a light source (not shown) is positioned to face the end surface 94 of the light guide plate 92. Light emitted by the light source enters the light guide plate 92 through the end surface 94 and is directed through the upper surface of the light guide plate and the optical film layer 88 and other layers above to illuminate the display glass substrate 78.

Below the light guide plate 92 is a reflective film layer 96 and a back plate 98 of a backlight unit. The backlight unit may comprise a backlight housing 100 that includes a base 104 and a projection portion 108 extending through an aperture in the back plate 98 and comprising a wall 110. In some examples the base 104 and projection portion 108 may comprise an elastomeric material, such as a thermoplastic elastomer. In the example of FIG. 3, the base 104 of the backlight housing 100 comprises a footing 112 that is bonded to floor 66 of the chassis 50 with an adhesive layer 114.

Figure 4:
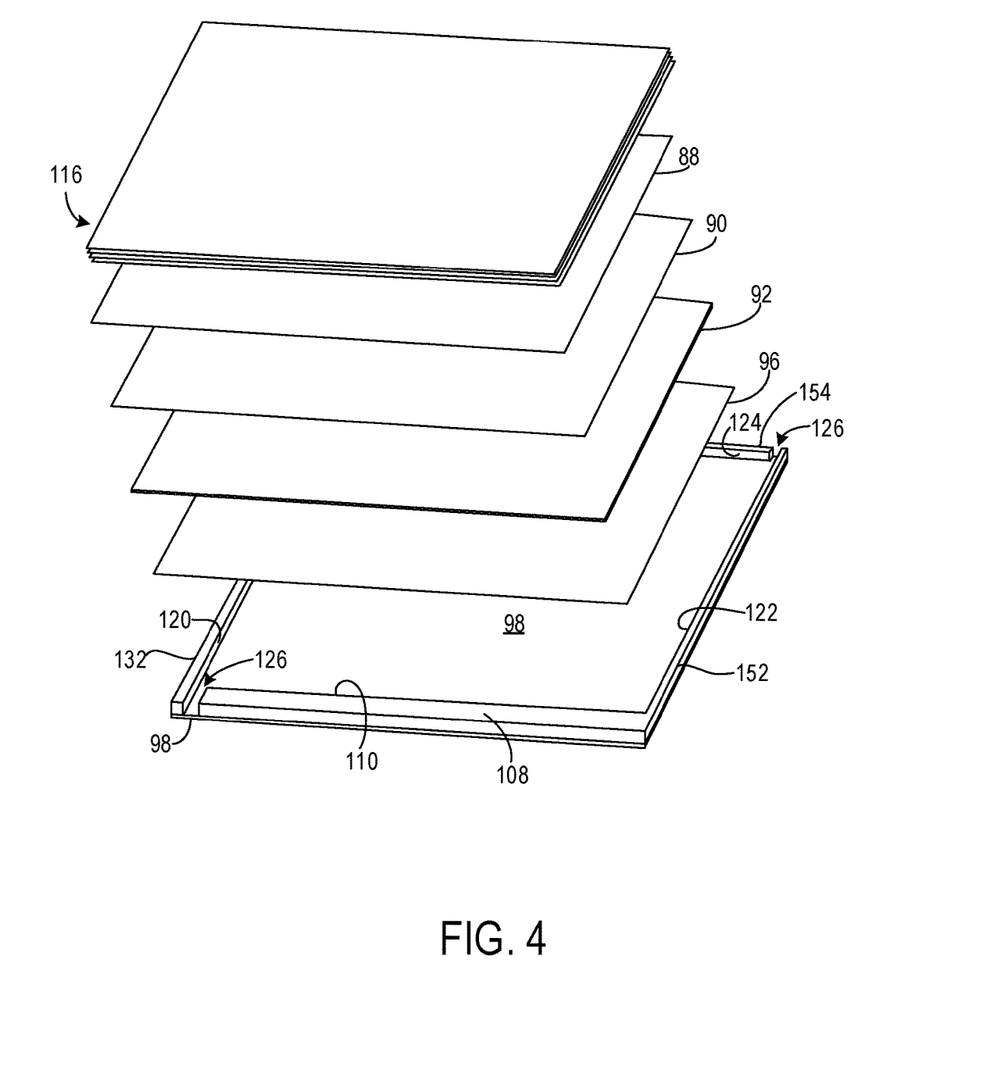
FIG. 4 shows an exploded view of a backlight housing and components of a display unit according to an example of the present disclosure.

With reference now to FIG. 4, in some examples the projection portion 108 of backlight housing 100 may be heat staked to the back plate 98. In this partial exploded view, the LCD unit 116 comprises the front polarizer layer 70, color filter glass substrate 76, display glass substrate 78 and rear polarizer layer 82. The upper optical film layer 88, diffuser substrate 90, light guide plate 92, and reflective film layer 96 may be contained within the walls 110, 120, 122 and 124. In this example, spacings 126 are provided between projection portion 108 and top portion 132, and between bottom portion 152 and outer portion 154, to allow for thermal expansion and contraction of these portions of backlight housing 100.

Figure 5:
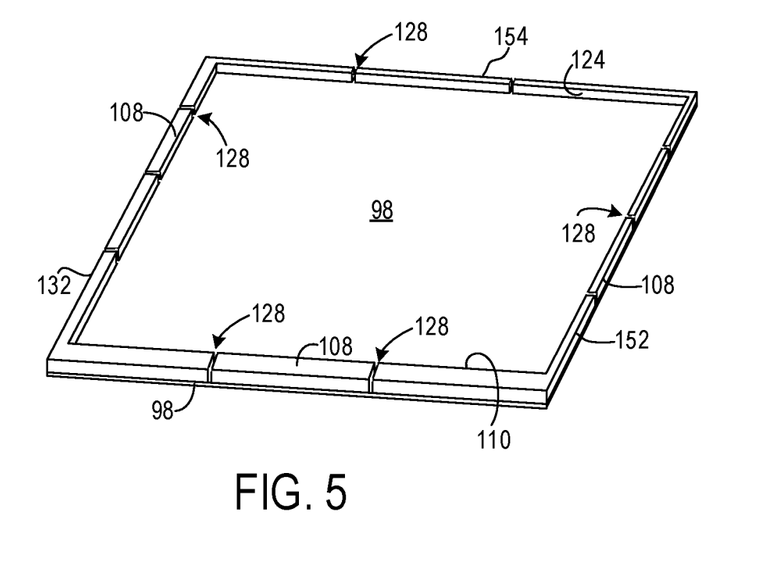
FIG. 5 shows a backlight housing according to other examples of the present disclosure.

In other examples the projection portion 108 of backlight housing 100 may be molded or bonded to the back plate 98. In one example and with reference to FIG. 5, the projection portion 108, top portion 132, bottom portion 152 and rear portion 154 may be injection molded around the back plate 98. A plurality of cuts 128 may be formed in these portions to allow for thermal expansion and contraction of the material without deforming or buckling the back plate 98.

With reference again to FIG. 3, the projection portion 108 of backlight housing 100 comprises a shelf 130. In this manner, an edge portion of the display glass layer 78 may be bonded to the shelf 130 of the backlight housing via an adhesive layer 134. In this manner, and by aligning the left edge of the display glass layer 78 to the left face 136 of projection portion 108, the non-active display area of bezel 216 may be reduced. In some examples the adhesive layer 134 may comprise a black or otherwise opaque material to block visibility of the light source, backlight housing 100 and/or other components of the display device. Additionally and with this configuration, the cover glass substrate 60 may not be affixed to the chassis 50.

The left edge 138 of cover glass substrate 60 also may be aligned with the left face 136 of projection portion 108 and left ends of other components of the display unit 64, thereby further reducing the width of bezel 216. With reference also to FIG. 2, the non-active display area may be defined by the bezel 216 between the active display area left edge 62 and the left edge 220 of left projection 56 of chassis 50, with the bezel having a width indicated at 218. In this example, the active display area left edge 62 is aligned with the left ends of each of the diffuser substrate 90, light guide plate 92, and reflective film layer 96.

By bonding an edge portion of the display glass layer 78 to the shelf 130 and utilizing other structural details described above, the configuration of the display device 12 of FIG. 3 may provide a bezel 216 with a width 218 of approximately 1.34 mm. In one example, the active display area may include those portions of cover glass 60 located to the right of active display area left edge 62 and continuing to an active display area right edge located adjacent to right edge 208 of the mobile computing device 12.

In the example of FIG. 3, the bezel 216 comprises a thickness 140 of the left projection 56 of chassis 50, a distance 144 between the left projection 56 and the left ends of components of the display unit 64, and a distance 150 from the left ends of components of the display unit 64 to the active display area left edge 62. As noted above, in some examples a width 218 of bezel 216 may be approximately 1.34 mm, which may comprise a distance 140 of approximately 0.54 mm, a distance 144 of 0.10 mm. and a distance 150 of 0.70 mm. In some examples, the width of bezel 216 may be further reduced by reducing the distance 144 between the left projection 56 and the left ends of components of the display unit 64, and/or reducing the gap between wall 110 of projection portion 108 and the left end of light guide plate 92 and other components opposite to wall 110.

Figure 6:
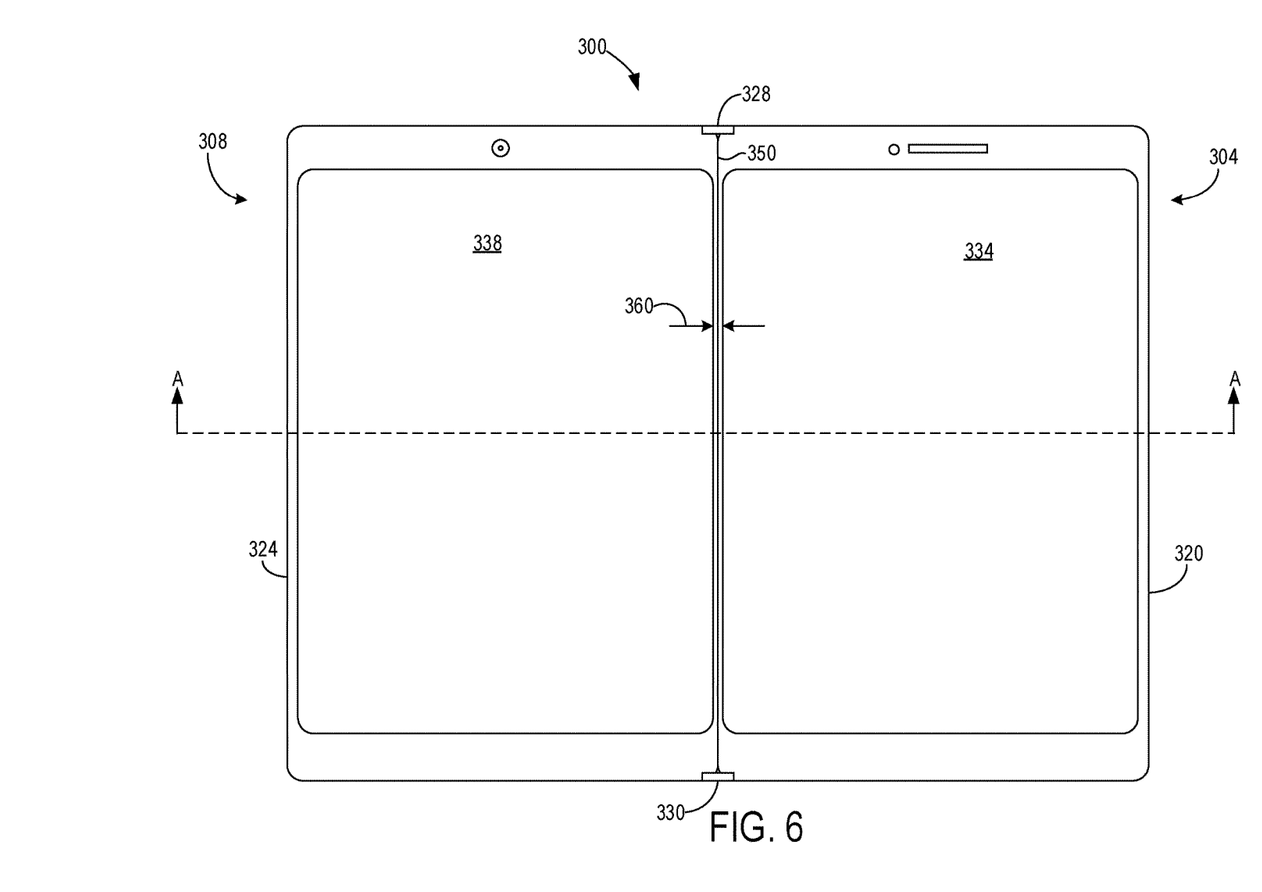
FIG. 6 shows a top view of a dual-display device according to examples of the present disclosure.
Figure 7:
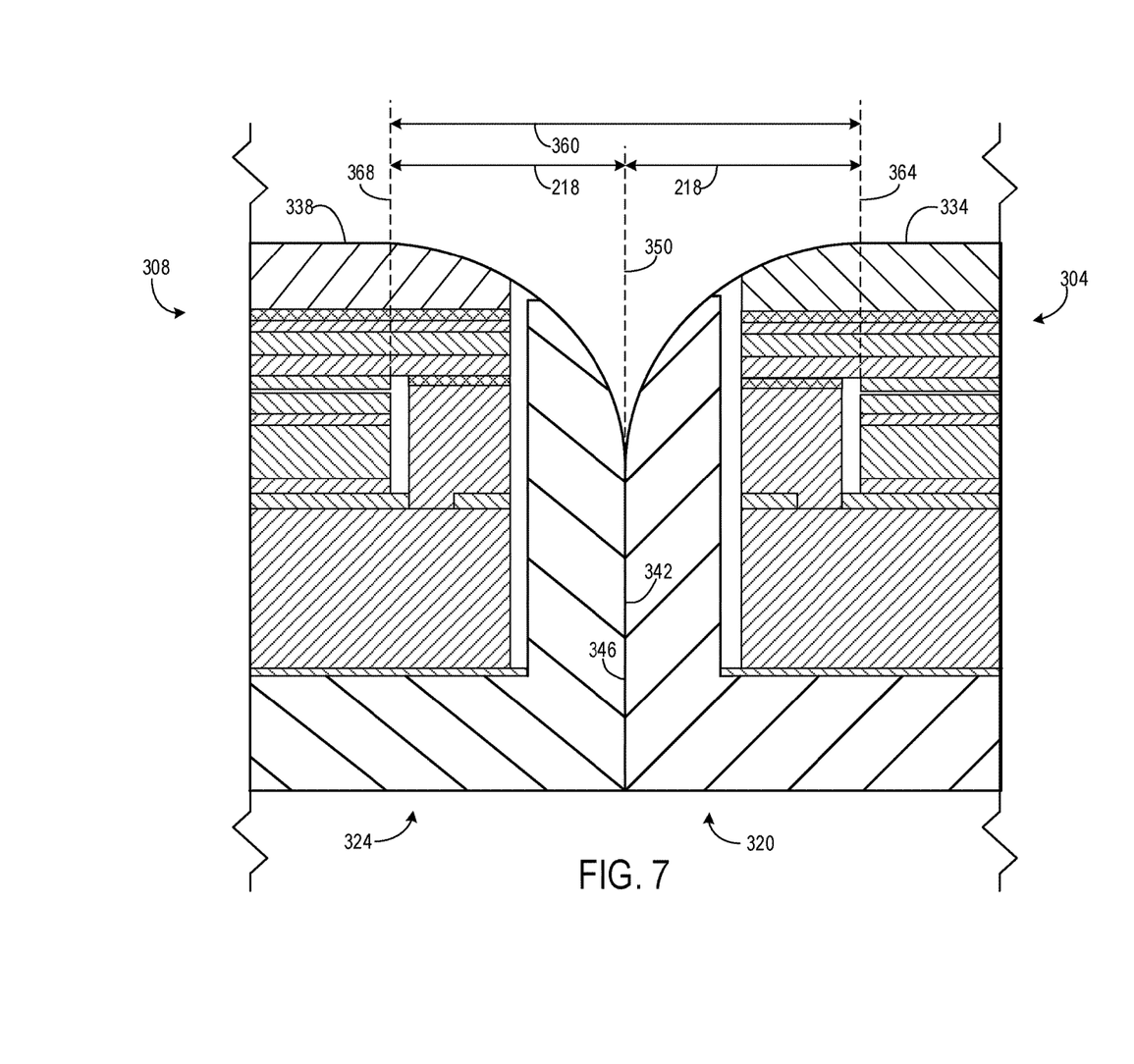
FIG. 7 shows a partial cross section view of the dual-display device taken along line A-A of FIG. 6 according to examples of the present disclosure.

With reference now to FIG. 6, in some examples the configurations described above may be utilized in two separate displays that are rotatably coupled to form a dual-display device 300. In these examples, the configuration of the display shown FIG. 3 may be utilized for a right side display 304, and a mirror image of this configuration may be utilized for a left side display 308. With reference also to FIG. 7, a first chassis 320 of the right side display 304 is rotatably coupled to a second chassis 324 of the left side display 308 via hinges 328, 330. In some examples, the hinges 328, 330 are configured to permit the pair of displays 304, 308 to rotate between angular orientations from a face-to-face angular orientation to a back-to-back angular orientation.

Hinges 328, 330 may permit the pair of display 304, 308 to rotate relative to one another such that an angle between them can be decreased or increased by the user applying suitable force to the housings of the displays. As shown in FIGS. 6 and 7, the first chassis 320 and second chassis 324 may be rotatably coupled in a manner that enables the right side display 304 and left side display 308 to be placed side-by-side in a 180 degree orientation, such that the two cover glass substrates 334, 338 are substantially parallel.

In the example of FIGS. 6 and 7, in this side-by-side orientation the left edge 342 of the first chassis 320 and the right edge 346 of the second chassis 324 are abutting along a common axis 350. In this manner, and with reference to the descriptions for the configuration of FIG. 3 above, each of the right side display 304 and left side display 308 may provide a non-active display area having a bezel width 218 of approximately 1.34 mm. In this manner, the dual-display device 300 may provide a deadband region 360 between a first active display area edge 364 of the right side display 304 and a second active display area edge 368 of the left side display 308 having a width of approximately 2.68 mm. In some examples, the width of deadband region 360 may be further reduced by reducing one or more distances and gaps within each display unit and/or chassis.

Figure 8:
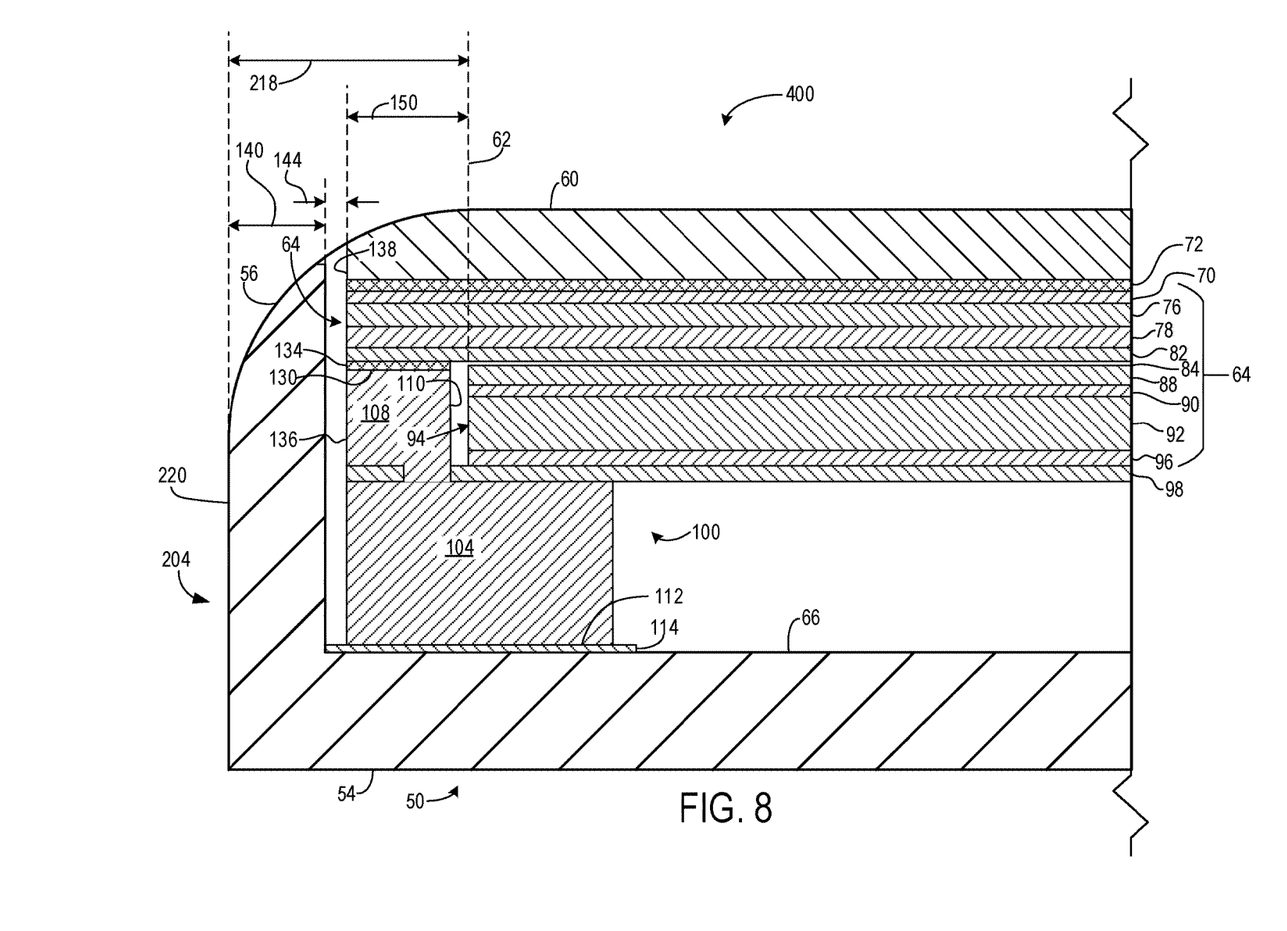
FIG. 8 shows a partial cross section view of a mobile display device according to another example of the present disclosure.

With reference now to FIG. 8, another embodiment of a mobile computing device 400 of the present disclosure is illustrated. In this example, the rear polarizer substrate 82 may extend over and be bonded to the shelf 130 of the backlight housing via adhesive layer 134. In this example, by aligning the left edge of the rear polarizing substrate 82 and other layers/substrates to the left face 136 of projection portion 108, the non-active display area defined by bezel 216 may be reduced.

As noted above, in some examples the adhesive layer 134 may comprise a black or otherwise opaque material to block visibility of the light source, backlight housing 100 and/or other components of the display device. Additionally and with this configuration, the cover glass substrate 60 may not be affixed to the chassis 50. The left edge 138 of cover glass substrate 60 also may be aligned with the left face 136 of projection portion 108 and left ends of other components of the display unit 64, thereby further reducing the width of the bezel. Accordingly, and by bonding an edge portion of the rear polarizer substrate 82 to the shelf 130 and utilizing other structural details described above, the configuration of the display device 400 of FIG. 8 may provide a reduced width of bezel 216 of approximately 1.34 mm.

Figure 9:
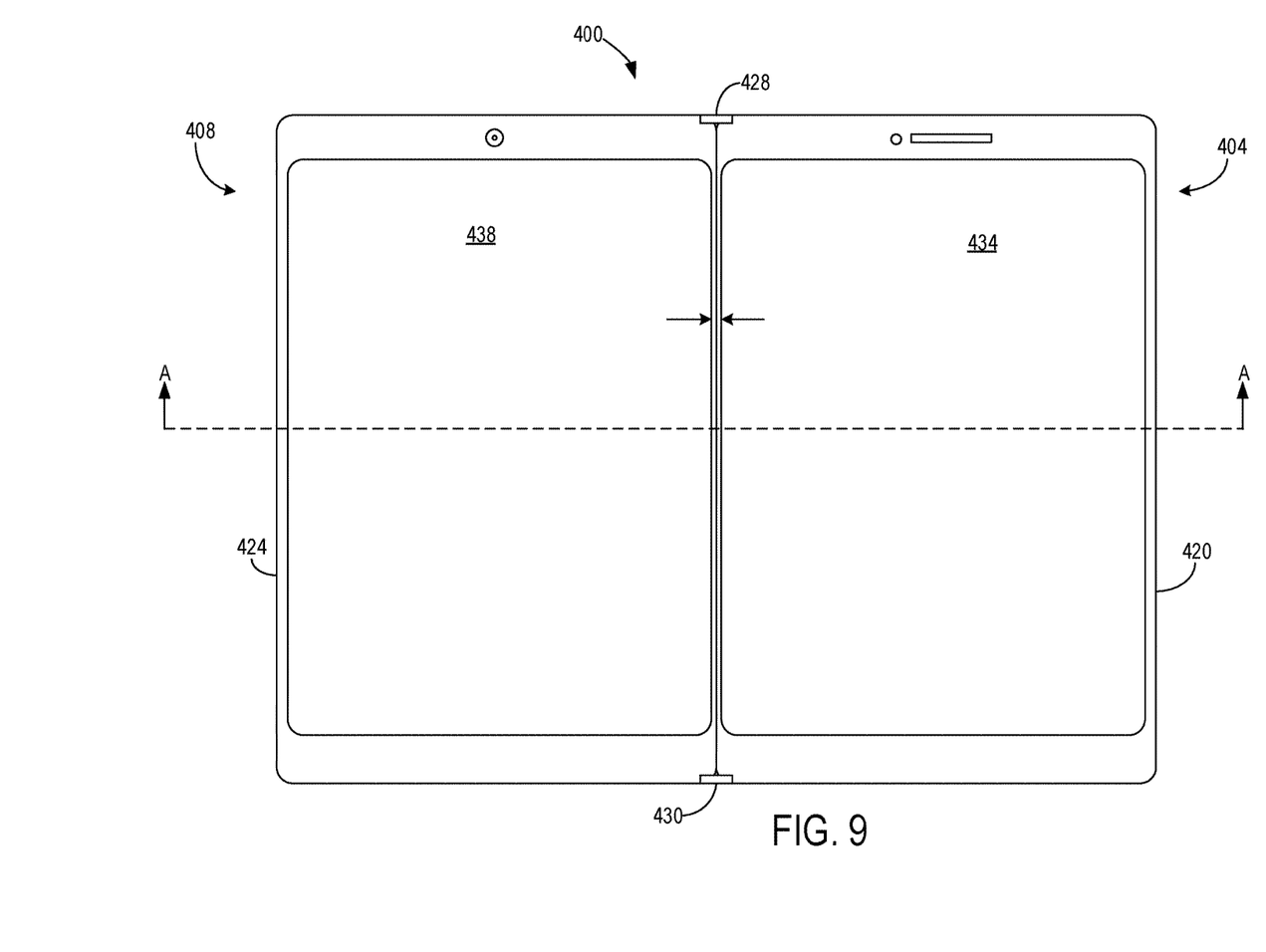
FIG. 9 shows a top view of a dual-display device according to another example of the present disclosure
Figure 10:
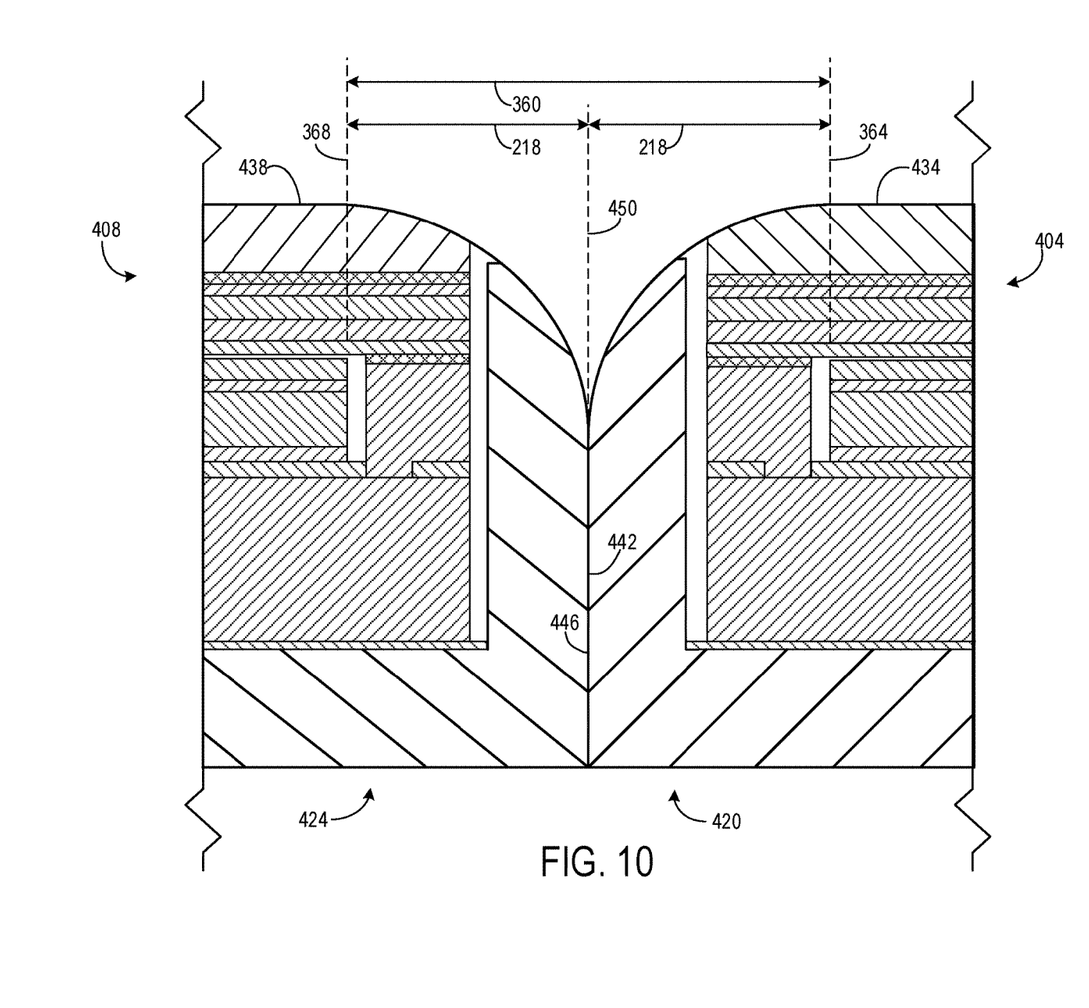
FIG. 10 shows a partial cross section view of the dual-display device taken along line A-A of FIG. 9 according to examples of the present disclosure.

With reference now to FIG. 9, in some examples the configurations described above for FIG. 8 may be utilized in two separate displays that are rotatably coupled to form another example of a dual-display device 400. In this example, the configuration of the display shown FIG. 8 may be utilized for a right side display 404, and a mirror image of this configuration may be utilized for a left side display 408. With reference also to FIG. 10, a first chassis 420 of the right side display 404 is rotatably coupled to a second chassis 424 of the left side display 408 via hinges 428, 430. In some examples, the hinges 428, 430 are configured to permit the pair of displays 404, 408 to rotate between angular orientations from a face-to-face angular orientation to a back-to-back angular orientation.

Hinges 428, 430 may permit the pair of displays 404, 408 to rotate relative to one another such that an angle between them can be decreased or increased by the user via applying suitable force to the housings of the displays. As shown in FIGS. 9 and 10, the first chassis 420 and second chassis 424 may be rotatably coupled in a manner that enables the right side display 404 and left side display 408 to be placed side-by-side in a 180 degree orientation, such that the two cover glass substrates 434, 438 are substantially parallel.

In the example of FIGS. 9 and 10 in this side-by-side orientation, the left edge 442 of the first chassis 420 and the right edge 446 of the second chassis 424 are abutting along a common axis 450. In this manner, and with reference to the descriptions for the configuration of FIG. 8 above, each of the right side display 404 and left side display 408 may provide a non-active display area having a bezel width 218 of approximately 1.34 mm. In this manner, the dual-display device 400 may provide a deadband region 360 between a first active display area edge 364 of the right side display 404 and a second active display area edge 368 of the left side display 408 having a width of approximately 2.68 mm. In some examples, the width of deadband region 360 may be further reduced by reducing one or more distances and gaps within each display unit and/or chassis.

Figure 11:
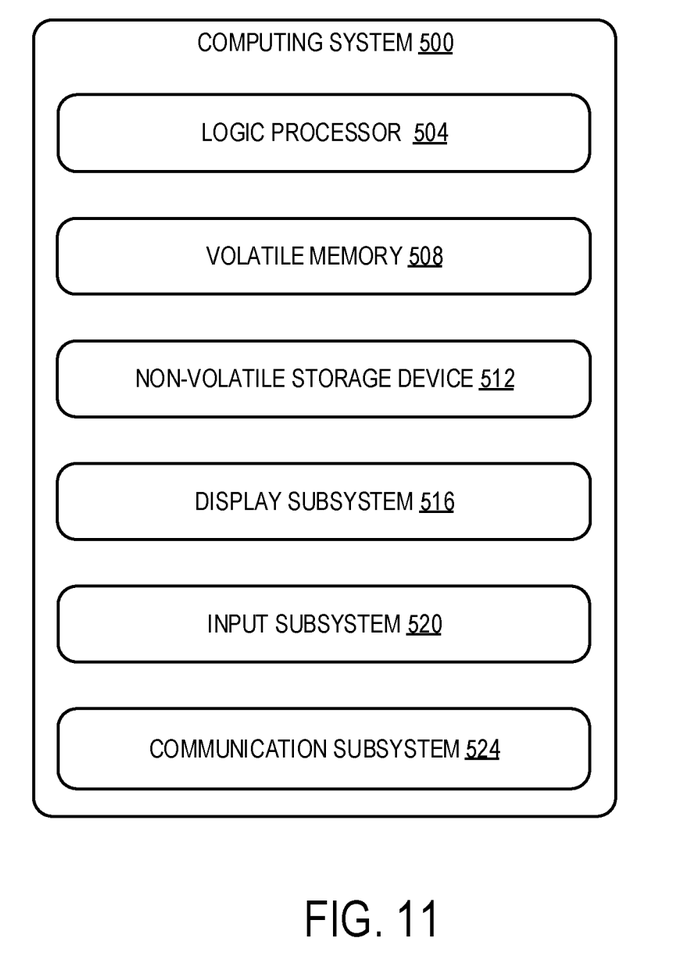
FIG. 11 shows a computing system according to an example of the present disclosure.

FIG. 11 schematically shows a non-limiting embodiment of a computing system 500. The display devices shown in FIGS. 1, 2, 6 and 9 may include one or more aspects of computing system 500. Computing system 500 is shown in simplified form. It is to be understood that virtually any computer architecture may be used without departing from the scope of this disclosure. Computing system 500 includes a logic processor 504, volatile memory 508, and a non-volatile storage device 512. Computing system 500 may optionally include a display subsystem 516, input subsystem 520, communication subsystem 524, and/or other components not shown in FIG. 11.

Logic processor 504 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 504 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 508 may include physical devices that include random access memory. Volatile memory 508 is typically utilized by logic processor 504 to temporarily store information during processing of software instructions. It will be appreciated that volatile memory 508 typically does not continue to store instructions when power is cut to the volatile memory 508.

Non-volatile storage device 512 includes one or more physical devices configured to hold instructions executable by the logic processors to implement the methods and processes described herein. When such methods and processes are implemented, the state of non-volatile storage device 512 may be transformed—e.g., to hold different data.

Non-volatile storage device 512 may include physical devices that are removable and/or built-in. Non-volatile storage device 512 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 512 may include nonvolatile, dynamic, static, read/write, read-only, sequential-access, location-addressable, file-addressable, and/or content-addressable devices. It will be appreciated that non-volatile storage device 512 is configured to hold instructions even when power is cut to the non-volatile storage device 512.

Aspects of logic processor 504, volatile memory 508, and non-volatile storage device 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 516 may be used to present a visual representation of data held by non-volatile storage device 512. As the herein described methods and processes change the data held by the non-volatile storage device, and thus transform the state of the non-volatile storage device, the state of display subsystem 516 may likewise be transformed to visually represent changes in the underlying data. Display subsystem 516 may include one or more display devices utilizing virtually any type of technology. Such display devices may be combined with logic processor 504, volatile memory 508, and/or non-volatile storage device 512 in a shared enclosure, or such display devices may be peripheral display devices.

When included, input subsystem 520 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, inertial measurement unit, and/or gyroscope for motion detection, gaze detection, and/or intent recognition, electric-field sensing componentry for assessing brain activity, any of the sensors described above with respect to HMD device 18, and/or any other suitable sensor.

When included, communication subsystem 524 may be configured to communicatively couple computing system 500 with one or more other computing devices. Communication subsystem 524 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

The following paragraphs provide additional support for the claims of the subject application. One aspect provides a display device, comprising: a chassis; a cover glass substrate; and a display unit positioned between the cover glass substrate and the chassis, the display unit comprising: a backlight housing comprising a shelf between the cover glass substrate and a base; a light guide plate positioned within the backlight housing; and a display glass substrate between the light guide plate and the cover glass substrate, the display glass substrate bonded to the shelf. The display device may additionally or alternatively include, wherein the base of the backlight housing comprises a footing that is bonded to the chassis. The display device may additionally or alternatively include, wherein the display glass substrate is bonded to the shelf with a black adhesive. The display device may additionally or alternatively include, wherein the cover glass substrate is not affixed to the chassis. The display device may additionally or alternatively include, wherein the display device is a single display device. The display device may additionally or alternatively include, wherein the display device is a dual-display device, wherein the chassis is a first chassis, the cover glass substrate is a first cover glass substrate, the display unit is a first display unit, and the dual-display device further comprises a second chassis rotatably coupled to the first chassis, wherein a second display unit is positioned within the second chassis. The display device may additionally or alternatively include, wherein a deadband region between a first active display area edge of the first display unit and a second active display area edge of the second display unit has a width of approximately 2.68 mm. The display device may additionally or alternatively include, wherein the second display unit comprises: a second backlight housing comprising a second shelf between the second cover glass substrate and a second base; a second light guide plate positioned within the second backlight housing; and a second display glass substrate between the second light guide plate and the second cover glass substrate, the second display glass substrate bonded to the second shelf.

Another aspect provides a display device, comprising: a chassis; a cover glass substrate; and a display unit positioned between the cover glass substrate and the chassis, the display unit comprising: a backlight housing comprising a shelf between the cover glass substrate and a base; a light guide plate positioned within the backlight housing; a display glass substrate between the light guide plate and the cover glass substrate; and a polarizer substrate between the display glass substrate and the light guide plate, the polarizer substrate bonded to the shelf. The display device may additionally or alternatively include, wherein the base of the backlight housing comprises a footing that is bonded to the chassis. The display device may additionally or alternatively include, wherein the polarizer substrate is bonded to the shelf with a black adhesive. The display device may additionally or alternatively include, wherein the cover glass substrate is not affixed to the chassis. The display device may additionally or alternatively include, wherein the display device is a single display device. The display device may additionally or alternatively include, wherein the display device is a dual-display device, wherein the chassis is a first chassis, the cover glass substrate is a first cover glass substrate, the display unit is a first display unit, and the dual-display device further comprises a second chassis rotatably coupled to the first chassis, wherein a second display unit is positioned within the second chassis. The display device may additionally or alternatively include, wherein a deadband region between a first active display area edge of the first display unit and a second active display area edge of the second display unit has a width of approximately 2.68 mm. The display device may additionally or alternatively include, wherein the second display unit comprises: a second backlight housing comprising a second shelf between the second cover glass substrate and a second base; a second light guide plate positioned within the second backlight housing; a second display glass substrate between the second light guide plate and the second cover glass substrate; and a second polarizer substrate between the second display glass substrate and the second light guide plate, the second polarizer substrate bonded to the second shelf.

Another aspect provides a dual-display device, comprising: a first chassis; a first cover glass substrate; a first display unit positioned between the first cover glass substrate and the first chassis, the first display unit comprising: a first backlight housing comprising a shelf between the first cover glass substrate and a first base; a first light guide plate positioned within the first backlight housing; first display glass substrate between the light guide plate and the cover glass substrate; and first polarizer substrate between the first display glass substrate and the first light guide plate, the first polarizer substrate bonded to the shelf; a second chassis rotatably coupled to the first chassis; a second cover glass substrate; a second display unit positioned between the second cover glass substrate and the second chassis, the second display unit comprising: second backlight housing comprising a second shelf between the second cover glass substrate and a second base; a second light guide plate positioned within the second backlight housing; a second display glass substrate between the second light guide plate and the second cover glass substrate; and a second polarizer substrate between the second display glass substrate and the second light guide plate, the second polarizer substrate bonded to the second shelf. The dual-display device may additionally or alternatively include, wherein a deadband region between a first active display area edge of the first display unit and a second active display area edge of the second display unit has a width of approximately 2.68 mm. The dual-display device may additionally or alternatively include, wherein the first cover glass substrate is not affixed to the first chassis. The dual-display device may additionally or alternatively include, wherein the first base of the first backlight housing comprises a first footing that is bonded to the first chassis.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and sub-combinations of the various components, configurations, and other features, functions, acts, and/or properties disclosed herein, as well as any and all equivalents thereof.

The invention claimed is:

1. A display device, comprising:
 a chassis;
 a cover glass substrate; and
 a display unit positioned between the cover glass substrate and the chassis, the display unit comprising:
  a backlight housing comprising a shelf between the cover glass substrate and a base, and a face extending between the shelf and the base;
  a light guide plate positioned within the backlight housing; and
  a display glass substrate between the light guide plate and the cover glass substrate, the display glass substrate bonded to the shelf, wherein an edge of the display glass substrate is aligned flush with the face of the backlight housing.

2. The display device of claim 1, wherein the base of the backlight housing comprises a footing that is bonded to the chassis.

3. The display device of claim 1, wherein the display glass substrate is bonded to the shelf with a black adhesive.

4. The display device of claim 1, wherein the cover glass substrate is not directly affixed to the chassis.

5. The display device of claim 1, wherein the display device is a single display device.

6. The display device of claim 1, wherein the display device is a dual-display device, wherein the chassis is a first chassis, the cover glass substrate is a first cover glass substrate, the display unit is a first display unit, and the dual-display device further comprises a second chassis rotatably coupled to the first chassis, wherein a second display unit is positioned within the second chassis.

7. The display device of claim 6, wherein a deadband region between a first active display area edge of the first display unit and a second active display area edge of the second display unit has a width of approximately 2.68 mm.

8. The display device of claim 6, wherein the second display unit comprises:
 a second backlight housing comprising a second shelf between a second cover glass substrate and a second base;
 a second light guide plate positioned within the second backlight housing; and
 a second display glass substrate between the second light guide plate and the second cover glass substrate, the second display glass substrate bonded to the second shelf.

9. A display device, comprising:
 a chassis;
 a cover glass substrate; and
 a display unit positioned between the cover glass substrate and the chassis, the display unit comprising:
  a backlight housing comprising a shelf between the cover glass substrate and a base, and a face extending between the shelf and the base;
  a light guide plate positioned within the backlight housing;
  a display glass substrate between the light guide plate and the cover glass substrate, wherein an edge of the display glass substrate is aligned flush with the face of the backlight housing; and a polarizer substrate between the display glass substrate and the light guide plate, the polarizer substrate bonded to the shelf.

10. The display device of claim 9, wherein the base of the backlight housing comprises a footing that is bonded to the chassis.

11. The display device of claim 9, wherein the polarizer substrate is bonded to the shelf with a black adhesive.

12. The display device of claim 9, wherein the cover glass substrate is not directly affixed to the chassis.

13. The display device of claim 9, wherein the display device is a single display device.

14. The display device of claim 9, wherein the display device is a dual-display device, wherein the chassis is a first chassis, the cover glass substrate is a first cover glass substrate, the display unit is a first display unit, and the dual-display device further comprises a second chassis rotatably coupled to the first chassis, wherein a second display unit is positioned within the second chassis.

15. The display device of claim 14, wherein a deadband region between a first active display area edge of the first display unit and a second active display area edge of the second display unit has a width of approximately 2.68 mm.

16. The display device of claim 14, wherein the second display unit comprises:
  a second backlight housing comprising a second shelf between a second cover glass substrate and a second base;
  a second light guide plate positioned within the second backlight housing;
  a second display glass substrate between the second light guide plate and the second cover glass substrate; and
  a second polarizer substrate between the second display glass substrate and the second light guide plate, the second polarizer substrate bonded to the second shelf.

17. A dual-display device, comprising:
  a first chassis;
  a first cover glass substrate;
  a first display unit positioned between the first cover glass substrate and the first chassis, the first display unit comprising:
    a first backlight housing comprising a shelf between the first cover glass substrate and a first base, and a first face extending between the shelf and the first base;
    a first light guide plate positioned within the first backlight housing;
    a first display glass substrate between the light guide plate and the cover glass substrate, wherein an edge of the first display glass substrate is aligned flush with the first face of the backlight housing; and
    a first polarizer substrate between the first display glass substrate and the first light guide plate, the first polarizer substrate bonded to the shelf;
  a second chassis rotatably coupled to the first chassis;
  a second cover glass substrate; and
  a second display unit positioned between the second cover glass substrate and the second chassis, the second display unit comprising:
    a second backlight housing comprising a second shelf between the second cover glass substrate and a second base, and a second face extending between the second shelf and the second base;
    a second light guide plate positioned within the second backlight housing;
    a second display glass substrate between the second light guide plate and the second cover glass substrate, wherein an edge of the second display glass substrate is aligned flush with the second face of the backlight housing; and
    a second polarizer substrate between the second display glass substrate and the second light guide plate, the second polarizer substrate bonded to the second shelf.

18. The dual-display device of claim 17, wherein a deadband region between a first active display area edge of the first display unit and a second active display area edge of the second display unit has a width of approximately 2.68 mm.

19. The dual-display device of claim 17, wherein the first cover glass substrate is not directly affixed to the first chassis.

20. The display device of claim 17, wherein the first base of the first backlight housing comprises a first footing that is bonded to the first chassis.

* * * * *